United States Patent
Orita et al.

(10) Patent No.: US 7,694,055 B2
(45) Date of Patent: Apr. 6, 2010

(54) DIRECTING INTERRUPTS TO CURRENTLY IDLE PROCESSORS

(75) Inventors: Ryuji Orita, Redmond, WA (US); Susumu Arai, Portland, OR (US); Brian D. Allison, Rochester, MN (US); Patrick M. Bland, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 11/251,334

(22) Filed: Oct. 15, 2005

(65) Prior Publication Data

US 2007/0088888 A1  Apr. 19, 2007

(51) Int. Cl.
*G06F 13/24* (2006.01)
(52) U.S. Cl. .................. 710/260; 710/261; 710/262; 710/263; 710/264; 710/265; 710/266; 710/267; 710/268; 710/269; 710/240
(58) Field of Classification Search ......... 710/260–269, 710/240–244
See application file for complete search history.

(56) References Cited

U.S. PATENT DOCUMENTS

| 4,959,781 | A | * | 9/1990 | Rubinstein et al. ......... 710/262 |
| 5,390,329 | A |   | 2/1995 | Gaertner et al. |
| 5,555,420 | A |   | 9/1996 | Sarangdhar et al. |
| 5,613,129 | A |   | 3/1997 | Walsh |
| 6,292,822 | B1 | * | 9/2001 | Hardwick ................... 718/105 |
| 2002/0042856 | A1 | * | 4/2002 | Hartwell et al. ............. 710/263 |
| 2003/0105798 | A1 | * | 6/2003 | Kim et al. ................... 709/105 |
| 2004/0107374 | A1 | * | 6/2004 | Cooper et al. .............. 713/320 |
| 2005/0028159 | A1 |   | 2/2005 | Kodama et al. |
| 2005/0060462 | A1 | * | 3/2005 | Ota ........................... 710/260 |

OTHER PUBLICATIONS

Samer Al-Khairi, "Power Management Features on the Embedded Ultra Low-Power Intel486 Processor," http://www.intel.com, accessed and printed from Internet Sep. 6, 2005.

\* cited by examiner

*Primary Examiner*—Mark Rinehart
*Assistant Examiner*—Kim T Huynh
(74) *Attorney, Agent, or Firm*—Jason O. Piche

(57) ABSTRACT

Interrupts are directed to currently idle processors. Which of a number of processors of a computing system that are currently idle is determined. An interrupt is received and directed to one of the currently idle processors for processing. Determining which processors are currently idle can be accomplished by monitoring each processor to determine whether it has entered an idle state. When a processor has entered an idle state, it is thus determined that the processor is currently idle. Where just one processor is currently idle, an interrupt is directed to this processor. Where more than one processor is currently idle, one of these processors is selected to which to deliver an interrupt, such as in a round-robin manner. Where no processor is currently idle, then one of the processors is selected to which to deliver an interrupt.

15 Claims, 2 Drawing Sheets

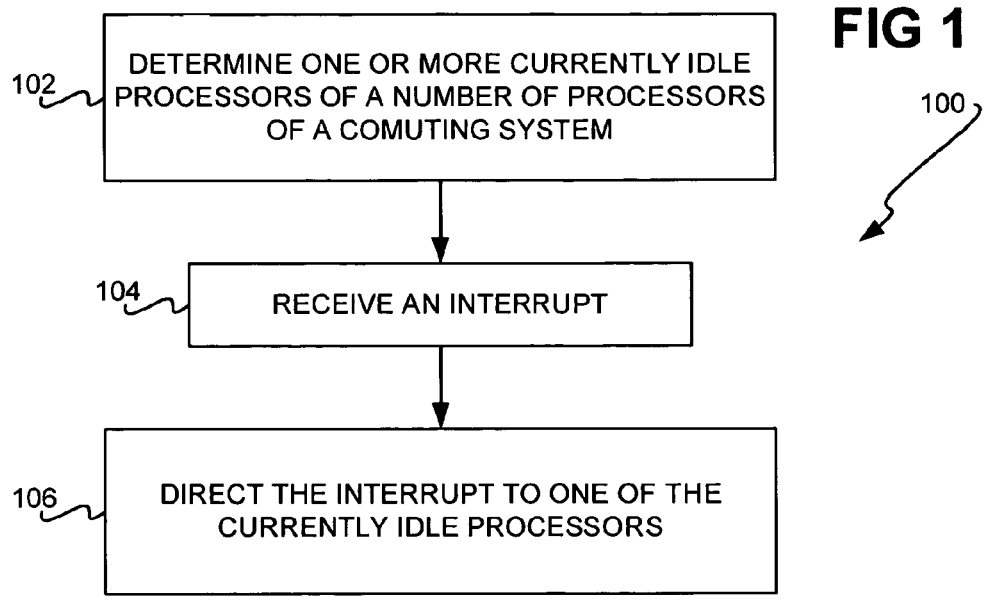
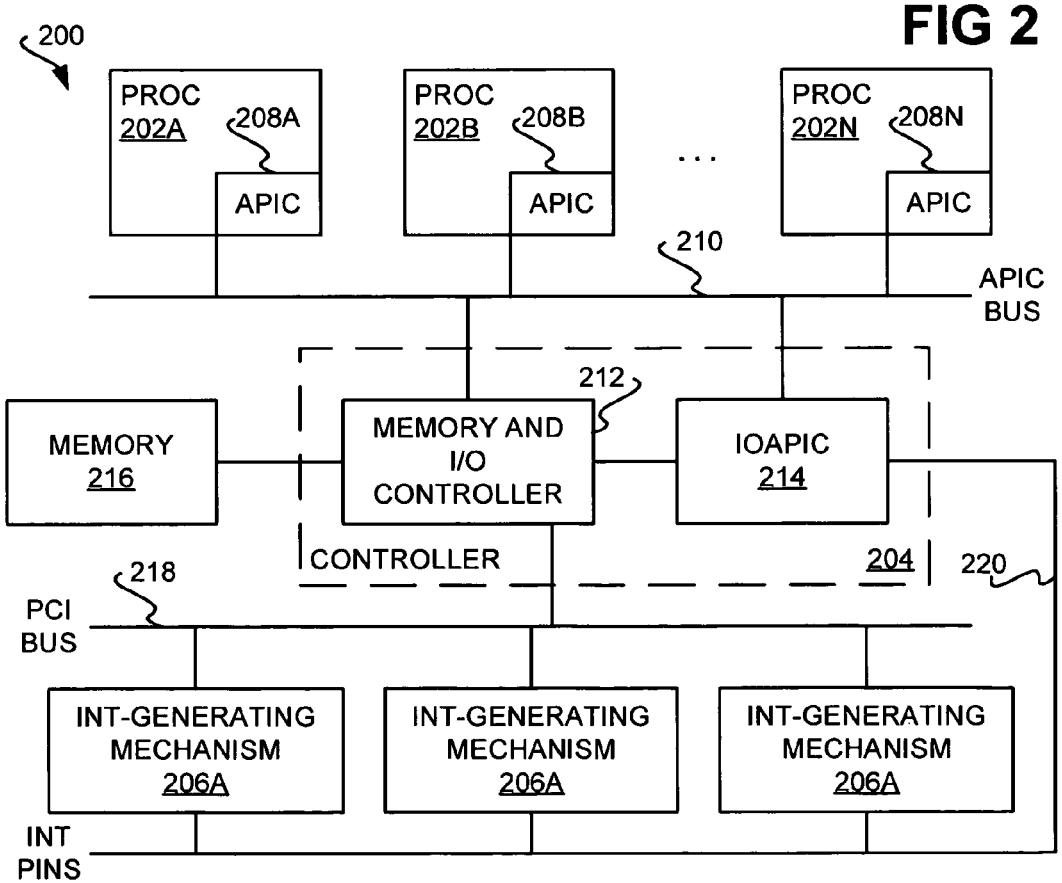

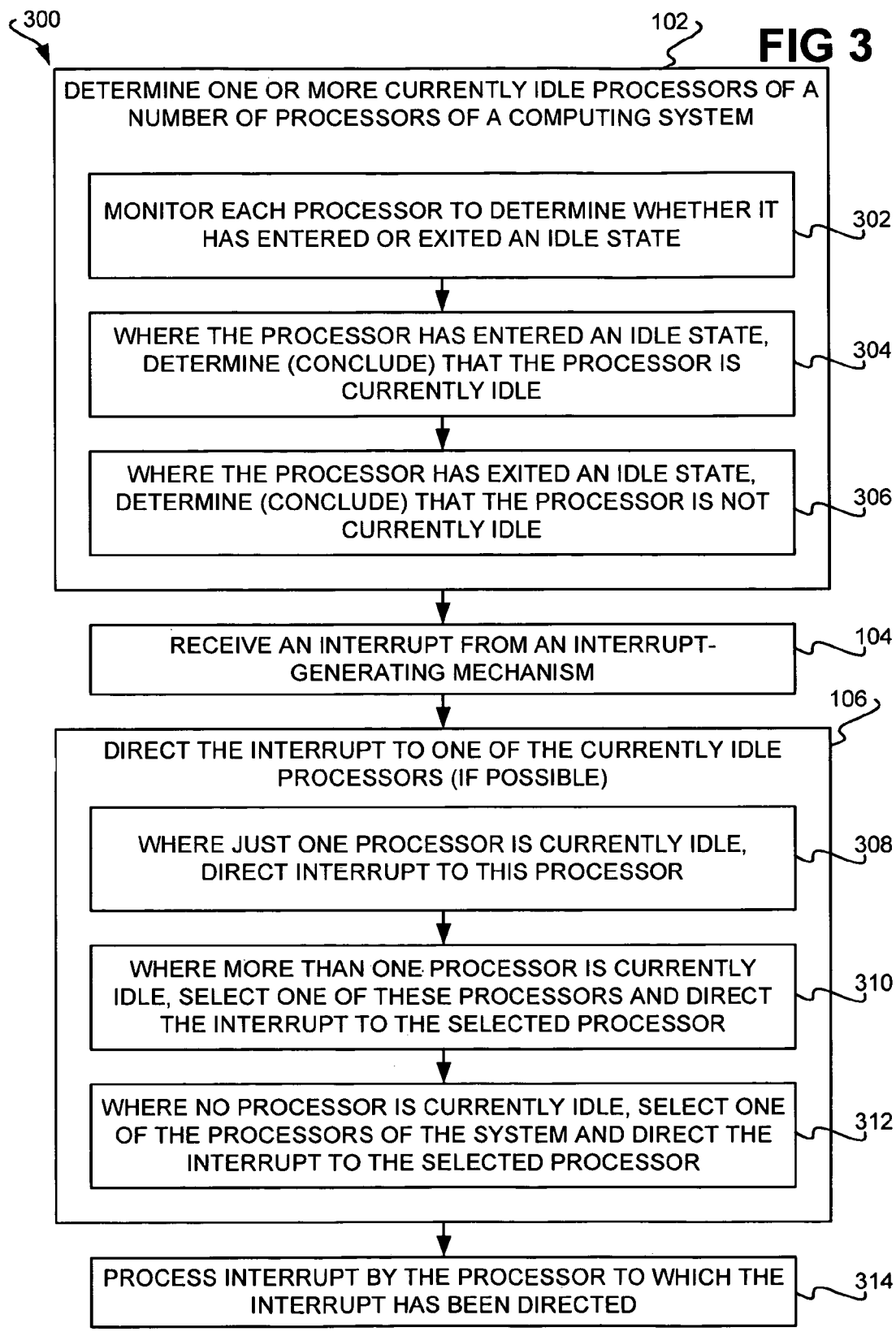

DIRECTING INTERRUPTS TO CURRENTLY IDLE PROCESSORS

FIELD OF THE INVENTION

The present invention relates generally to directing interrupts to processors for processing of the interrupts, and more particularly to directing interrupts to processors that are currently idle for processing of the interrupts.

BACKGROUND OF THE INVENTION

Within computing systems, an interrupt can be considered a signal that receives the attention of a processor and that is usually generated when input/output (I/O) activity is required. For example, interrupts may be generated when a key on the keyboard is pressed or when the mouse or other pointing device is moved. Other types of interrupts are generated by network controllers, storage devices, video devices, and other kinds of hardware devices.

In a computing system with more than one processor, an interrupt is typically delivered to the processor servicing the lowest priority thread. A thread is a part of a process that may be part of a computer program being executed by a processor. A computer program may have one or more processes, and each process may have one or more threads. The threads may be run independently of one another, or may be dependent on one another. The priorities of the threads dictate how many processor cycles the threads receive to execute the threads. A lower-priority thread, for instance, may receive less processor cycles than a higher-priority thread does, especially where the processor in question is executing a large number of threads.

Delivering interrupts to the processor of a multiple-processor computing system that is currently servicing the lowest priority thread is disadvantageous, however. A processor, for instance, may be servicing a large number of low-priority threads, and therefore may be relatively busy. Requiring this processor to also service interrupts can result in degradation of the overall performance of the computing system, because the processor is required to service the interrupts before continuing with servicing the low-priority threads.

Determining the priorities of threads being executed by the processors of a computing system has typically been determined by a transaction known as an external Task Priority Register (xTPR) Update transaction. Periodically each processor provides information regarding the priorities of its threads via such transactions. In this way, the controller or other interrupt-delivery mechanism is able to monitor which processor is servicing the lowest-priority thread, and thus to which processor interrupts should be delivered. It is noted that the operating system itself controls the priority of a task, by updating a corresponding Task Priority Register (TPR) within the processor. When this register is updated by the operating system, the processor then sends a special transaction on its front side bus (FSB) so that interrupt redirection logic can update its register, the xTPR, to which the TPR within the processor corresponds.

However, some processors do not support the xTPR Update transaction. As a result, such processors may not be able to be used within computing systems that deliver interrupts to the processor servicing the lowest priority thread. Furthermore, some operating systems do not utilize these transactions. For example, some versions of Linux do not use the TPR to set interrupt priority levels, such that interrupt delivery to the processor currently servicing the lowest priority thread cannot be achieved in such an operating system.

For these and other reasons, there is a need for the present invention.

SUMMARY OF THE INVENTION

The present invention relates to directing interrupts to currently idle processors. In a method of the invention, which of a number of processors of a computing system that are currently idle is determined. When an interrupt is received, it is directed to one of the currently idle processors for processing. Determining which processors are currently idle can be accomplished in one embodiment by monitoring each processor to determine whether it has entered an idle state. For instance, when the processor has executed a HALT processor instruction, it may be determined that the processor is in an idle state. Thus, when a processor has entered an idle state, it is determined that the processor is currently idle.

In one embodiment, where just one processor is currently idle, an interrupt is directed to this processor. In another embodiment, where more than one-processor is currently idle, one of these processors is selected to which to deliver an interrupt, such as in a round-robin manner employing redirection counter logic. In another embodiment, where no processor is currently idle, then one of the processors is selected to which to deliver an interrupt, such as again in a round-robin manner.

A computing system of the present invention includes a number of processors, one or more interrupt-generating mechanisms, and a controller. The controller is to receive interrupts from the interrupt-generating mechanisms, and is to direct each interrupt to one of the processors that is currently idle, for processing of the interrupt. An article of manufacture of the invention includes a computer-readable medium, such as a modulated carrier signal or a recordable data storage medium, and means in the medium. The means is for receiving an interrupt and for directing the interrupt to one of a number of processors that is currently idle.

Embodiments of the invention provide for advantages over the prior art. Unlike the prior art, in which interrupts are directed to processors that are servicing lowest priority threads, in the invention interrupts are directed to processors that are currently idle. Thus, overall system performance is not degraded by interrupt servicing, since interrupts are preferably serviced by processors that are otherwise idle and not currently servicing any threads, even lowest priority threads.

Furthermore, embodiments of the invention do not need to employ xTPR Update transactions in order to achieve interrupt delivery. Therefore, embodiments of the invention can be implemented in conjunction with processors that do not support xTPR Update transactions, as well as in conjunction with operating systems that do not support these transactions. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method for interrupt processing, according to an embodiment of the invention, and is suggested for printing on the first page of the patent.

FIG. 2 is a diagram of a computing system having multiple processors, according to an embodiment of the invention.

FIG. 3 is a flowchart of a method for interrupt processing that is more detailed than but consistent with the method of FIG. 1, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

FIG. 1 shows a method 100, according to a preferred and rudimentary embodiment of the invention. The method 100 first determines which of a number of processors of a multiple-processor computing system are currently idle (102). Such processors are referred to as currently idle processors. Currently idle processors are processors that are not currently performing any tasks. For instance, such processors are not currently servicing any active threads, even lowest-priority threads, and are otherwise not executing any processor instructions. Part 102 of the method 100 may be constantly or periodically performed to determine which of the processors are currently idle, since each processor may enter and exit an idle state as it receives, executes, and finishes executing processing tasks.

The method 100 receives an interrupt (104). The interrupt is receiving from an interrupt-generating mechanism. An interrupt in one embodiment is a signal that is to receive the attention of a processor, and that is generated by an interrupt-generating mechanism when relatively immediate input/output (I/O) activity is required. Interrupt-generating mechanisms may include input devices, such as keyboards and pointing devices, network controllers, storage devices, video devices, and other kinds of hardware devices. The method 100 finally delivers or directs the interrupt to one of the currently idle processors for processing of the interrupt (106). Parts 104 and 106 of the method 100 are typically repeated for each interrupt that is received.

An interrupt is thus timely serviced in conjunction with the method 100 of FIG. 1 with little or no degradation in overall system performance. This is because preferably the processor that ultimately processes the interrupt is not performing any other tasks, and therefore can service the interrupt without affecting other processors that may be performing other tasks. Interrupt delivery to currently idle processors is in contradistinction to the prior art, which achieves interrupt delivery to processors that are currently servicing lowest-priority tasks, where execution of such tasks may be delayed in order to service interrupts.

Technical Background

FIG. 2 shows a representative multiple-processor computing system 200, according to an embodiment of the invention. The computing system 200 includes a number of processors 202A, 202B, ..., 202N, collectively referred to as the processors 202. There is more than one processor 202. The computing system 200 also includes an overall controller 204, which may also be referred to as a chipset or an interrupt-delivery or an interrupt-direction mechanism. The computing system 200 further includes a number of interrupt-generating mechanisms 206A, 206B, ..., 206N, collectively referred to as the interrupt-generating mechanisms 206. The number of mechanisms 206 is typically, but not necessarily, greater than the number of processors 202. The interrupt-generating mechanisms 206 may include input devices, such as keyboards and pointing devices, network controllers, storage devices, video devices, as well as other kinds of hardware devices. The computing system 200 may further include memory 216, such as dynamic random access memory (DRAM), as well as other hardware and software components not shown in FIG. 2.

The processors 202 include Advanced Programmable Interrupt Controllers (APIC's) 208A, 208B, ..., 208N, collectively referred to as APIC's 208. The APIC's are more generally the local controllers of the processors 202 that are responsible for processing interrupts received by the processors 202 on the APIC bus 210, to which the APIC's 208 and thus the processors 202 are communicatively connected. The overall controller 204 includes a memory and input/output (I/O) controller 212 and an input/output APIC (IOAPIC) 214. In one embodiment, the APIC bus 210 may be a collection of dedicated signals to deliver interrupts from the IOAPIC 214 to the local APIC's 208 within the processors 202. In another embodiment, the APIC bus 210 may be a general purpose bus that includes sideband or special messages used to deliver interrupts. That is, in this latter embodiment, the APIC bus 210 does not have to be a dedicated bus.

The memory and I/O controller 212 is responsible for communicating with the interrupt-generating mechanisms 206 over the Peripheral Component Interconnect (PCI) bus 218, with the memory 216, and with the APIC's 208 over the APIC bus 210. The IOAPIC 214 receives interrupts from the interrupt-generating mechanisms 206 over interrupt pins 220, where each of the mechanisms 206 are individually connected to the IOAPIC 214 by a corresponding one of the interrupt pins 220. The IOAPIC 214 delivers the interrupts to the APIC's 208 of the processors 202, and thus to the processors 202, over the APIC bus 210.

In practice, then, the interrupt-generating mechanisms 206 generate interrupts, which are received by the IOAPIC 214 of the overall controller 204 via the interrupt pins 220. The memory and I/O controller 212 of the controller 204 instructs the IOAPIC 214 to which of the processors 202—i.e., to which of the APIC's 208 of the processors 202—to deliver or direct each interrupt. Based on this instruction, the IOAPIC 214 delivers or directs the interrupts received from the interrupt-generating mechanisms 206 to the APIC's 208 of the processors 202. The memory and I/O controller 212 may monitor the processors 202, as is described in the next section of the detailed description, in order to select to which of the processors 202 the IOAPIC 214 should deliver interrupts.

Detailed Method

FIG. 3 shows a method 300 for processing interrupts, according to an embodiment of the invention. The method 300 is more detailed than but consistent with the method 100 of FIG. 1 that has been described. The method 300 is particularly described in relation to the multiple-processor computing system 200 of FIG. 2. However, as can be appreciated by those of ordinary skill within the art, the method 300 may be performed in relation to other types of multiple-processor computing systems, and not just the multiple-processing computing system 200 of FIG. 2.

The method 300 determines which of the processors 202 of the computing system 200 are currently idle processors (102). Part 102 of the method 300 may be constantly or periodically performed, because the processors 202 are constantly or periodically becoming idle or non-idle, as they receive, execute, and finish executing processing tasks. Part 102 may be particularly performed by the memory and I/O controller 212 of the controller 204 of the computing system 200. In one embodiment, determining which of the processors 202 are currently idle processors is accomplished by performing parts 302, 304, and 306 of the method 300.

First, each processor is monitored to determine whether it has entered or exited an idle state (302). Where a given processor has entered an idle state, it is determined, or concluded, that the processor is currently idle (304). By comparison, where a given processor has exited an idle state, it is determined, or concluded, that the processor is no longer currently idle (306).

For instance, in one embodiment, where a processor performs a HALT processing instruction, it may be determined or concluded that the processor is in an idle state and thus currently idle. The HALT instruction is executed by a processor to enter a low-power state. Upon execution of such an instruction, the processor automatically enters this low-power state, which may be referred to as an auto-halt power-down state. In this low-power state, the processor does not perform any processing tasks, and thus is currently idle. Upon the execution of another processing instruction, the processor exits the low-power state, and therefore is no longer in an idle state and thus is no longer currently idle.

Next, the method 300 receives an interrupt from one of the interrupt-generating mechanisms 206 (104). In particular, the IOAPIC 214 of the controller 204 of the multiple-processor computing system 200 may receive an interrupt from one of the interrupt-generating mechanisms 206. The interrupt is directed, by the IOAPIC 214 of the controller 204, to one of the currently idle processors, if possible, and specifically to the APIC of one of the currently idle processors (106). Parts 104 and 106 are performed for each interrupt that is received from the interrupt-generating mechanisms 206. The IOAPIC 214-learns to which of the processors 202 it should direct a received interrupt from the memory and I/O controller 212 of the controller 204, which as has been described, monitors the processors 202 to determine which of them are currently idle.

In one embodiment, part 106 of the method 300 is accomplished by performing parts 308, 310, and 312. Therefore, where just one processor is currently idle, the interrupt is directed to this processor (308). That is, the memory and I/O controller 212 of the controller 204 directs the IOAPIC 214 of the controller 204 to deliver the interrupt to the only processor that is currently idle.

Where more than one processor is currently idle, one of these currently idle processor is selected, and the interrupt is directed to the selected processor (310). That is, the memory and I/O controller 212 determines that more than one processor is currently idle, selects one of these processors, and directs the IOAPIC 214 to deliver the interrupt to the selected currently idle processor. In one embodiment, one of the currently idle processors is selected in a round-robin manner, so that received interrupts are offloaded to the currently idle processors in a uniform manner. For example, if there are three currently idle processors, the first interrupt is delivered to the first processor, the second interrupt is delivered to the second processor, the third interrupt is delivered to the third processor, the fourth interrupt is delivered to the first processor, the fifth interrupt is delivered to the second processor, and so on. Such round-robin selection of the currently idle processors may be achieved by employing redirection counter logic, as can be appreciated by those of ordinary skill within the art. Other approaches to processor selection may also be utilized instead of a round-robin approach.

In some situations, an interrupt may be received where none of the processors 202 are currently idle. Therefore, where no processor is currently idle, one of the processors 202 of the computing system 200 is selected, even though it is not currently idle, and the interrupt is directed to the selected processor (312). That is, the memory and I/O controller 212 determines that none of the processors 202 are currently idle, selects one of these processors 202, and directs the IOAPIC 214 to deliver the interrupt to the selected non-currently idle processor. In one embodiment, one of the processors 202 is selected in a round-robin manner, as has been described in the previous paragraph, or in accordance with another selection approach. Finally, the processor to which the interrupt has been directed receives and processes the interrupt (314).

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   determining one or more currently idle processors from a plurality of processors;
   initially receiving an interrupt, only by a controller separate from the plurality of processors such that none of the plurality of processors receives the interrupt before the controller receives the interrupt, the controller being an entity other than a processor; and,
   delivering the interrupt, by the controller separate from the plurality of processors, to one of the currently idle processors for processing, comprising:
      where more than one of the plurality of processors is currently idle, selecting in a round-robin manner one of the currently idle processors to which to deliver the interrupt for processing, the one of the currently idle processors being selected from all the currently idle processors,
         such that where the interrupt is a first interrupt and such that the currently idle processors consist of a first currently idle processor, a second currently idle processor, and a third currently idle processor, the first interrupt is delivered to the first currently idle processor, a second interrupt is delivered to the second currently idle processor, a third interrupt is delivered to the third currently idle processor, a fourth interrupt is delivered to the first currently idle processor, and a fifth interrupt is delivered to the second currently idle processor,
      wherein just the one of the currently idle processors to which the interrupt was delivered receives the interrupt, and no other of the plurality of processors ever receives the interrupt.

2. The method of claim 1, wherein determining the currently idle processors from the plurality of processors comprises, for each of the plurality of processors:
   monitoring the processor to determine whether the processor has entered an idle state; and,
   where the processor has entered the idle state, determining that the processor is currently idle.

3. The method of claim 2, wherein monitoring the processor to determine whether the processor has entered the idle state comprises monitoring the processor to determine whether the processor has executed a HALT instruction.

4. The method of claim 1, wherein delivering the interrupt to one of the currently idle processors for processing further comprises, where just one of the plurality of processors is currently idle, delivering the interrupt to the only processor that is idle.

5. The method of claim 1, wherein selecting one of the currently idle processors in the round-robin manner comprises employing redirection counter logic.

6. The method of claim 1, wherein delivering the interrupt to one of the currently idle processors for processing further comprises, where none of the plurality of processors is currently idle, selecting one of the processors to which to deliver the interrupt for processing.

7. The method of claim 6, wherein selecting one of the processors to which to deliver the interrupt for processing comprises selecting one of the processors in a round-robin manner.

8. The method of claim 1, further comprising processing the interrupt by the processor to which the interrupt has been delivered.

9. A computing system comprising:

a plurality of processors;

one or more interrupt-generating mechanisms; and, a controller separate from the plurality of processors to receive interrupts from the interrupt-generating mechanisms, such that none of the plurality of processors receives the interrupt before the controller receives the interrupt and only the controller initially receives the interrupt, and the controller is to deliver each interrupt to one of the processors that is currently idle for processing, wherein just the one of the currently idle processors to which an interrupt is delivered receives the interrupt, and no other of the plurality of processors ever receives the interrupt, and the controller is an entity other than a processor, and wherein, where more than one of the processors are currently idle, the controller is for each interrupt to select in a round-robin manner one of the processors that are currently idle to which to deliver the interrupt for processing, the one of the currently idle processors being selected from all the currently idle processors, such that where the interrupt is a first interrupt and such that the currently idle processors consist of a first currently idle processor, a second currently idle processor, and a third currently idle processor, the first interrupt is delivered to the first currently idle processor, a second interrupt is delivered to the second currently idle processor, a third interrupt is delivered to the third currently idle processor, a fourth interrupt is delivered to the first currently idle processor, and a fifth interrupt is delivered to the second currently idle processor.

10. The computing system of claim 9, wherein the controller is to monitor the processors to determine whether each processor has entered an idle state and therefore is currently idle, and to determine whether the processor has exited the idle state and therefore is no longer currently idle.

11. The computing system of claim 9, wherein, where just one of the processors is currently idle, the controller is to deliver each interrupt to the only processor that is idle for processing.

12. The computing system of claim 9, wherein, where none of the processors are currently idle, the controller is to select one of the processors to which to deliver the interrupt for processing.

13. The computing system of claim 12, wherein the controller is to select one of the processors in a round-robin manner.

14. An article of manufacture comprising:

a tangible computer-readable medium; and, means in the medium for receiving an interrupt, by a controller separate from a plurality of processors, such that none of the plurality of processors receives the interrupt before the controller receives the interrupt and only the controller initially receives the interrupt, and the means further for delivering the interrupt, by the controller separate from the plurality of processors, to one of the plurality of processors that is currently idle, wherein just the one of the currently idle processors to which the interrupt was delivered receives the interrupt, and no other of the plurality of processors ever receives the interrupt, and the controller is an entity other than a processor, and wherein the means is further for selecting in a round-robin manner one of the processors to which to deliver the interrupt where more than one of the processors are currently idle, the one of the currently idle processors being selected from all the currently idle processors, such that where the interrupt is a first interrupt and such that the currently idle processors consist of a first currently idle processor, a second currently idle processor, and a third currently idle processor, the first interrupt is delivered to the first currently idle processor, a second interrupt is delivered to the second currently idle processor, a third interrupt is delivered to the third currently idle processor, a fourth interrupt is delivered to the first currently idle processor, and a fifth interrupt is delivered to the second currently idle processor.

15. The article of manufacture of claim 14, wherein the means is further for monitoring the processors to determine whether each processor has entered an idle state and therefore is currently idle, and to determine whether the processor has exited the idle state and therefore is no longer currently idle.

* * * * *